(12) United States Patent
Moore et al.

(10) Patent No.: US 7,756,820 B2
(45) Date of Patent: Jul. 13, 2010

(54) ACTIVITY BROWSER

(75) Inventors: Dennis B. Moore, Burlingame, CA (US); Joerg Beringer, Frankfurt (DE)

(73) Assignee: SAP AG (DE)

( * ) Notice: Subject to any disclaimer, the term of this patent is extended or adjusted under 35 U.S.C. 154(b) by 418 days.

(21) Appl. No.: 11/184,734

(22) Filed: Jul. 19, 2005

(65) Prior Publication Data

US 2006/0015387 A1    Jan. 19, 2006

(30) Foreign Application Priority Data

Jul. 19, 2004    (EP) ................................ 04016962

(51) Int. Cl.
G06F 7/00 (2006.01)
(52) U.S. Cl. .................................................. 707/600
(58) Field of Classification Search ............... 707/8; 705/1, 9
See application file for complete search history.

(56) References Cited

U.S. PATENT DOCUMENTS

| | | | | |
|---|---|---|---|---|
| 5,845,289 A * | 12/1998 | Baumeister et al. | ..... | 707/103 R |
| 6,609,128 B1 * | 8/2003 | Underwood | ........... | 707/10 |
| 2002/0069214 A1 * | 6/2002 | Smith et al. | ........... | 707/500 |
| 2003/0055748 A1 * | 3/2003 | Bezrukov et al. | ........... | 705/27 |
| 2003/0090514 A1 * | 5/2003 | Cole et al. | ........... | 345/744 |
| 2003/0204458 A1 * | 10/2003 | Carroll et al. | ........... | 705/35 |

* cited by examiner

Primary Examiner—Pierre M Vital
Assistant Examiner—Truong V Vo
(74) Attorney, Agent, or Firm—Holland & Knight LLP; Brian J. Colandreo, Esq.; Mark H. Whittenberger, Esq.

(57) ABSTRACT

Methods and apparatus, including computer program products, for an activity browser. A computer system includes a user interface linked to a processor arranged to perform instructions in accordance with a business application stored in a memory, the business application including context code portions representing at least one context, the context representing a business situation, service interface code portions defining at least two interfaces between services and the context, each of the interfaces arranged for exchanging data from a parameter of the context and the service associated with the context, and user-interface code portions for outputting at the user interface data representing information about the context.

20 Claims, 4 Drawing Sheets

Fig. 2

Control Center — 41

- Home (410)
- Activities (411, 414)
- Resource (415)
- Status (413)
- All (414)
- Inbox (412)
- Schedule <Enter search text here> — 40

Work Centers — 42
- ⊗ Order Management
  - Invoice Management — 420
  - Market Research
- ⊗ Projects
  - Cost Savings Strategy — 420
  - SRM Implementation
  - Policy Report
- ⊗ Procedures
  - New Hire — 420
  - Supplier XYZ Review
  - Negotiation XYZ
- ⊗ Event Resolutions
  - Duplicate Invoice XYZ — 420
  - Missing Data BlaBla
  - Blocked Order ABC

[Open]

436

| Worklist | New POs (1/2) | Status | Actions | People | Resource |
|---|---|---|---|---|---|
| 431 | 432 | 433 | 434 | 435 | 436 |

Show ☑ Exceptions ☑ Regular Requests ☐ On Hold  Filter by 43

| | Request # | Material # ▼ | Material Name | Qty | Value | Requester |
|---|---|---|---|---|---|---|
| ☐ | 100010 | 000001 | Material Name 1 | 100 | $ | Frank Sanders |
| ☐ | 100011 | 000002 | Material Name 2 | 200 | $ | Paul Zimmermann |
| ☐ | 100012 | 000003 | Material Name 3 | 300 | $ | Frank Sanders |
| ☐ | 100013 | 000004 | Material Name 4 | 400 | $ | Paul Zimmermann |
| ☐ | 100014 | 000005 | Material Name 5 | 100 | $ | Frank Sanders |
| ☐ | 100015 | 000006 | Material Name 6 | 200 | $ | Paul Zimmermann |
| ☐ | 100016 | 000007 | Material Name 7 | 400 | $ | Paul Zimmermann |

|◁◀ 7 of 30 ▶▷|  [Consolidate] [Hold] [Delete]

Details — 437

| Request | Suppliers | Requester |

Exception: Missing Source of Supply

Note

[eMail PO ▼] [Send]

ACTIVITY BROWSER

CROSS REFERENCE TO RELATED APPLICATIONS

This application claims the benefit from EP 04016962.5, filed on Jul. 19, 2004, the entire contents of which is incorporated herein by reference.

BACKGROUND

The present invention relates to data processing by digital computer, and more particularly to an activity browser.

Business applications aid users in performing their activities within an enterprise. For example, a business application may guide a user through the steps of a certain business process in a certain order, such as hiring a new employee. A business application uses multiple services. For different steps in a business process the business application may provide the user with one or more services at a user interface, such as filling in and submitting a form to a database (e.g., with the new employees, name, address, and so forth), and ordering items (e.g., a workplace for the new employee, and so forth).

Typically, a service is implemented as a set of procedures or functions hosted on a computer server connected to network. A computer on which the business application is running can request data from the server by submitting a set of parameters to the set of procedures or functions on the server. Services can be implemented as Web services, which allow a user of a web browser to request extended markup language (XML) data from the server by submitting parameters to the server. Web services (sometimes called application services) are services (usually including some combination of programming and data, but possibly including human resources as well) that are made available from a business's Web server for Web users or other Web-connected programs. Web services include major services like storage management and customer relationship management (CRM) to more limited services, such as furnishing a stock quote and checking bids for an auction item.

Most business applications have a low ease of use. Different services each have a specific interface to a user in which different data is provided data to the user. Hence, it is difficult for a user of the business applications to gather from the data provided by the respective services, the information related to a certain task, activity, or other business situation role within an enterprise.

SUMMARY

The present invention provides methods and apparatus, including computer program products, for an activity browser.

In general, in one aspect, the invention features a computer system, including a user interface linked to a processor arranged to perform instructions in accordance with a business application stored in a memory, the business application including context code portions representing at least one context, the context representing a business situation, service interface code portions defining at least two interfaces between services and the context, each of the interfaces arranged for exchanging data from a parameter of the context and the service associated with the context, and user-interface code portions for outputting at the user interface data representing information about the context.

In embodiments, the business application can include data selecting code portions for selecting from the context data depending on a selection criterion and outputting at the user interface the selected data. The business application can include context selecting code portions for selecting at least one selected context depending on a selection criterion, and the user-interface code portions arranged from outputting at the user interface data from at least one selected context. The data selecting code portions and/or context selecting code portions can be arranged to select the context data and/or context depending on a user.

The data selecting code portions and/or context selecting code portions can be arranged to select the context data and/or context depending on a role of the user within an enterprise. The business application can include control code portions for allowing the user to select a context, and code portions for outputting data from the user selected context at the user interface.

In embodiments, the data from the context can include information about activities to be performed in the business situation represented by the context. The data from the selected context can include status information about a state of an aspect of the business situation represented by the context. The business application can include context modifying code portions for providing at the user interface at least one control to modify a parameter of the selected context.

In embodiments, the business application can include service code portions for invoking at least one of the services associated with the selected context.

In another aspect, the invention features a computer-implemented method for running a business application including providing a memory in which at least one context is stored, the context representing a business situation, enabling an interface between the context and a service associated with the context, the interface providing exchange of data between a parameter of the context and a service associated with the context, and outputting data from the context at a user interface.

The invention can be implemented to realize one or more of the following advantages.

An activity browser lists all ongoing work contexts of a user and provides contextual views on each of the work contexts. The activity browser operates on a common work context layer that is instantiated in stateful context templates. Each context supports generic views on work context-like resources, participants, pending actions, related actions, achievements, exceptions, worklists, and so forth.

The activity browser enables a business user to browse through ongoing activities, such as projects, teams, roles, procedures, and problem resolutions, by operating on a common context layer that drives the different contextual views for each of the contexts. The list of available views is determined by a common context model, a context class, and a particular context template.

One implementation of the invention provides all of the above advantages.

Other features and advantages of the invention are apparent from the following description, and from the claims.

BRIEF DESCRIPTION OF THE DRAWINGS

FIG. 2 is a user interface (UI).

DETAILED DESCRIPTION

Like reference numbers and designations in the various drawings indicate like

Business users are engaged in many activities they need to oversee and monitor. In traditional design of transactional ERP systems, it is cumbersome for the users to poll together all information needed to understand a business problem or a state of a coherent activity because the information is embedded in many different applications. Our method enables an activity browser that lists all ongoing work contexts of a user and provides contextual views on each of the work contexts. The activity browser operates on a common work context layer that is instantiated on stateful context template. Each context supports generic views on work context like resources, participants, pending actions, related actions, achievements, exceptions, worklists, and so forth. The activity browser enables a business user to browse through ongoing activities such as projects, teams, roles, procedures, problem resolutions, and so forth, by operating on a common context layer that drives the different contextual views for each of the contexts. The list of available contextual views is determined by the common context model, the context class, and the particular context template.

The activity browser unifies entities that have been treated very differently and inconsistently in the past, e.g., teamrooms, role overview pages, WorkCenters and Guided Procedure Instance. This unification is done by abstracting each of these entities and treats them as a work instance that has a specific context. Role-based activity spaces are included and harmonized with ad-hoc activity spaces. This solves a problem of a portal by integrating organizational roles with dynamic ad-hoc work contexts, such as instances of teamrooms, for example.

The activity browser creates a user experience by enabling users to browse their personal ongoing activities and inspect them from different perspectives without leaving a control center.

Figure 1:
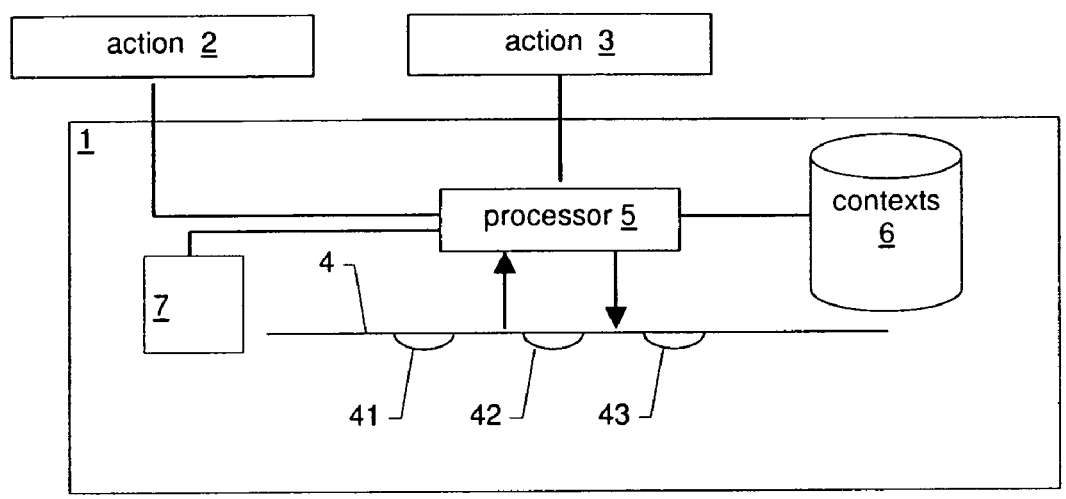
FIG. 1 is a block diagram of an exemplary computer system.

In FIG. 1, an exemplary computer system 1 is shown. The computer system 1 is linked to server systems 2, 3, which provide a service to the computer system 1. The computer system 1 includes a user-interface 4, a processor 5, a context repository 6 and a memory 7. The processor 5 is connected to the user-interface 4, the context repository 6 and the memory 7.

In the memory 7, data representing a business application are stored. In this example, the processor 5 performs instructions in accordance with the program code of the business application. The operations performed by the processor 5 in accordance with the program code of the business application are referred to as being performed by the business application.

In the context repository 6, contexts are stored. Each of the contexts contains a representation of a business situation. In this example, the contexts are objects that have a structure and parameters defined by a context template. A context template provides meta-data about a context and represents a meta-model of a business situation. The context template defines the structure of the context, possible parameters, how the context and services interact in terms of parameter passing, and so forth. The meta-model can define parameters related to a specific work context, such as artifacts used in the work context, actions that can be performed and people involved in the work context, or any other suitable parameter.

The context further represents a model of a business situation that conforms to the meta-model represented by the context template. In this example, the parameters of the object (i.e., the model) are assigned values that represent aspects of a real life business situation of a type modeled by the context. For example, a context can model a supplier review procedure, and values are assigned to that model, such as an actual supplier of an enterprise.

The business application may use data from one or more contexts to assist a user of the business application in operating within an enterprise. For example, the business application can output data representing information about the context at the user-interface 4, and contain user-interface code portions that perform these tasks. Context data may be selected depending on a certain selection criterion and outputted at the user-interface 4. One or more contexts may be selected depending on a selection criterion, and, at the user interface, data from the selected contexts may be outputted.

A context may be selected, or data can be selected, depending on the role of a user in an enterprise. For example, contexts that contain a parameter having a value corresponding to a role of a user may be selected. Information about the selected contexts can then be outputted at the user-interface 4. An identifier of the selected context can then be outputted at the user-interface 4. At the user-interface 4, the business application may provide suitable controls so that the user can select a context. In response to selecting by the user a certain context, data contained in the user-selected context or information derived from those data may be outputted.

From context, parameters may be selected that have a value corresponding to the role of a user, or parameters that refer to another parameter having such a value. At the user-interface 4 information about the selected parameter may then be outputted. A context containing a representation of a process may contain parameters "initiator" and "participants" and from those a parameter with a value corresponding to the role of a user in an enterprise, e.g., "engineer," may be selected and information outputted. Here, the process to which the parameter "initiator" refers is an identifier of the parameter or other suitable data.

From a context, information about activities to be performed in the business situation represented by the context may be selected and outputted. Thus, a user can be informed about pending activities. For example, from a context, parameters of a type "action" may be selected, and a value of the parameters representing the due date may be outputted at the user-interface 4. Other information may also be outputted at the user-interface 4, such as the type of activity, participants, or any other suitable information.

Also, from context parameters may be selected that contain data representing information about a state of an aspect of the business situation represented by the context. For example, for a context that represents a development of a new project, data may be selected and outputted that informs the user about the remaining budget, the status of the development, or other suitable information.

At the user-interface 4, the business application can provide controls in which a context can be modified. For example, control can be provided in which a user can cause the business application to transfer data from the context to service 2, 3, or invoke at least one of the services associated with the selected context in another suitable manner.

A context may represent an activity-centric model. The context then provides a model of an activity within an enterprise, such as a role, topic, task, or event in a business situation. Depending on the specific type of activity, certain types of actions and resources can be used in a context and can be configured in the context. For example, an activity-centric model can model how, in a certain business situation, a user is provided with certain information, such as work-lists, work status dashboards, resources, participants, and so forth.

The context may be a model of collaborative activities in a business. The context can, for example, contain parameters representing those of a collaborative activity, such as the parameters: initiator, participants, actions to be performed, and contain data about these parameters. For example, the context may contain a parameter "initiator" with a value "manager", or "delegate", and so forth. In this example, the value "manager" may than have the name of an actual person operating in a business situation of the type modeled by the context.

The context may be an object-centric model. The context then provides a model that is centered on an object in a business situation. For example, the context can be a model of a business situation centered on a certain job. The context can include object related operations, as well as views on all facets on the object. Different job roles may be interested in different facets of the same object type.

The context may also represent a process-centric model. The context template then provides a model of a workflow in a business situation. Most actions are executed as predefined process steps. Because of the nature of workflow, selected steps may be owned by different users. The context may then model that the process has an initiator, and types of participants, which steps are to be performed by which types of participants, and so forth. The context may further model the role of the initiator role in an enterprise, the position of the participants within the enterprise, and so forth.

Figure 3:
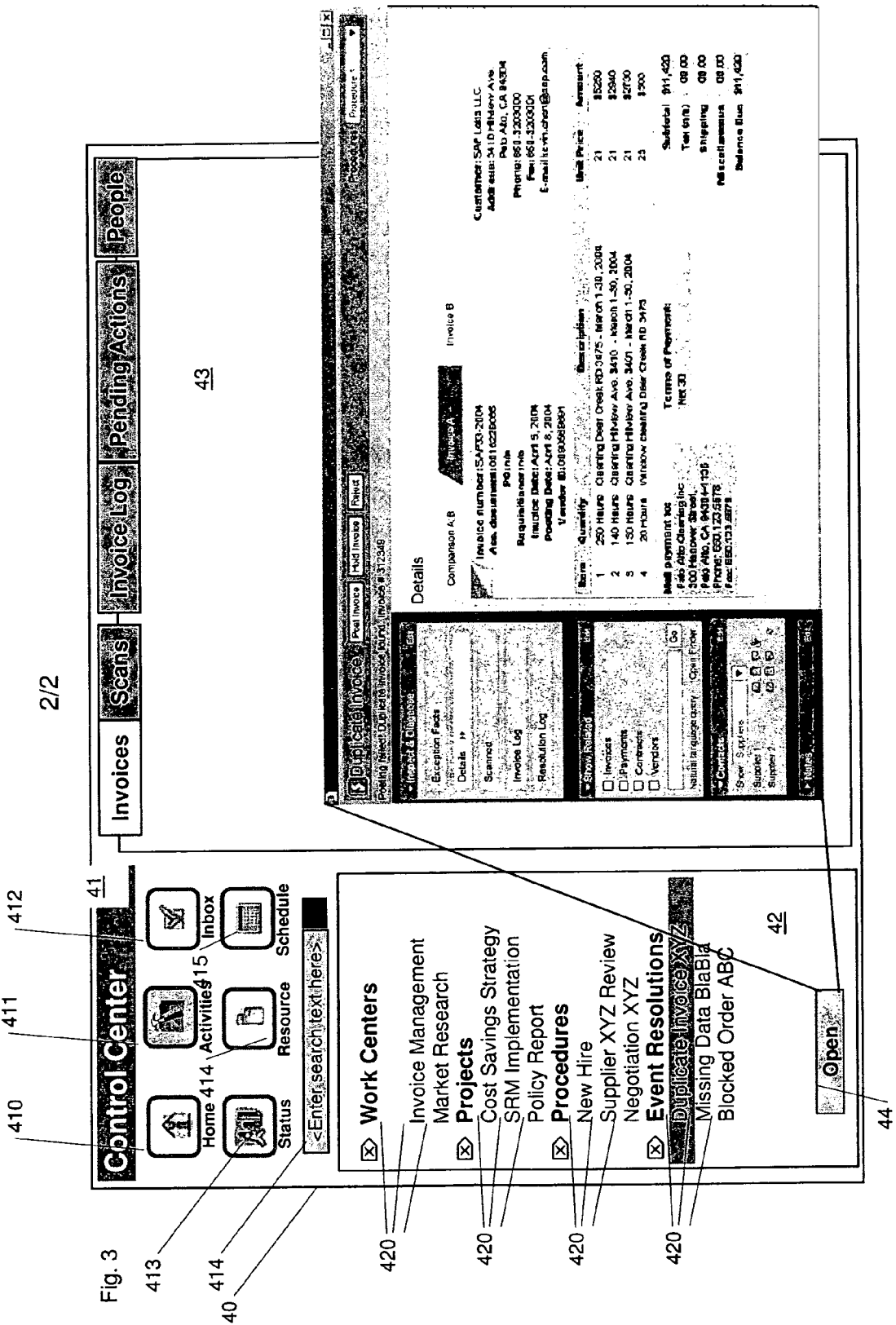
FIG. 3 is a UI in a service invoked state.

FIG. 3 shows an exemplary user-interface 40. The user interface 40 includes a graphical user-interface in which information may be outputted for a user. The user-interface 40 includes a control panel 41 and an information panel 43. In the control panel 41, the information outputted in the information panel 43 is controlled by controls 410-415; 420. The control panel 41 may be referred to as a control center. In this example, the control panel 41 is provided with a module control field 42.

A user can select a module of the business application using controls 410-415. Depending on the selected module, different data is outputted in the module control field 42 and the information panel 43. For example, if the user selects the module control 410 with the identifier "Home", a news-paper like overview page may be outputted in the information panel 43. The module control field 42 allows a user to select recently viewed articles or his favorite news items to be outputted in the information panel 43.

When a user selects the module control 411 with the identifier "inbox", a module of the business application may be activated that outputs in the information panel 43, for example incoming messages and requests and provides in the module control field 42 controls by which a user can select a certain type of message to be viewed in the information panel, such as incoming purchase orders only.

Selecting the module control 413 with the identifier "status" can activate a module of the business application that outputs in the information panel 43 data about the status of pending tasks, key performance indicators of a certain object, process or other status information.

When the module control with the identifier "Resources" is selected in the information pane 43, information about resources available using the user-interface 40 may be outputted. This can include information about resources, such as documents and templates stored on the computer system or services accessible using the user-interface 40. In the module control field 42, controls may then be provided by the business application, in which a user can select a certain type of resource, e.g., resources related to traveling.

Selecting the module control 415 with the identifier "schedule" may cause the business application to output in the information panel information suitable for time management of personal and business events and to provide in the module control field 42 controls in which the user can select over which period of time the information in the information panel 43 extends, e.g., a day, a week, a month. Other controls may also be provided.

Control 411 is provided in the control panel 410 with the identifier "Activities". This control is referred to as the context control 411. When the context control 411 is selected a context browser module of the business application is activated. The context browser module is also referred to as an activity browser. The context browser module outputs in the module control field 42 controls in which a user may, for example, select a context about which information is outputted in the information panel 43.

In the module control field 42, identifiers 420 of contexts present in the context repository 4 are shown. In this example, the identifiers 420 are ordered by type, e.g., contexts that relate to projects are grouped together, contexts that relate to procedures are grouped together, and so forth.

In FIG. 3, the business application has outputted at the user-interface 40 only identifiers 420 to selected contexts, as well as information common to at least some of the selected context. In this example, the information common to at least some of the selected contexts is an identifier of the context type, e.g., a work center, a project, a procedure or an event resolution. The identifiers 420 further act as controls in which a user can select a context, for example, by positioning a pointer of a computer mouse on the identifier and clicking a mouse button. In this particular example, a context with an identifier "order management" is selected by the user.

In the information panel 43, data representing information about the "order management" context is outputted in response to the selection by the user. In this example, the information panel 43 includes parameter select controls 430-435 in which a user can select certain parameters of the selected context. For example, the parameter selection controls 430-435 can allow the user to select parameters of a type: worklist, trigger, status, pending actions, task calendar, achievements, participants, resources, actions, favorites, related information, or assistances.

Depending on the selected parameter selection control 430-435, in the information panel 43, which now acts as a context information panel, information about parameters of the selected type is outputted.

For example, when the selected type is "worklist", information related to processing piles of work items is outputted in the information panel 43.

When the selected type is "trigger", information from parameters in the selected context that relate to work triggers, e.g., triggers that initiated a certain activity, is outputted in the information panel 43.

When the selected type is "status", data is extracted from the context that contains information about the status of ongoing work in the business situation represented by the context and outputted in the information panel 43.

When the selected type is "pending actions", data is retrieved from the parameters of the selected context that represents information about pending workflow processes in the business situation represented by the context, and outputted in the information panel 43.

When the selected type is "task calendar", a plan and a schedule of the work is outputted in the information panel 43.

When the selected type is "achievements", information about modifications to the parameters in the selected context is retrieved, and outputted in the information panel 43. Thus, the user can obtain information about a history and progress of the context, and the business situation represented by the context.

When the selected type is "participants", from the selected context data containing information about actors in the business situation represented by the selected context, is retrieved and outputted in the information panel 43.

When the selected type is "resources", data from parameters containing pointers or representing artifacts and knowledge resources is outputted in the information panel 43.

When the selected type is "actions" in the information panel, identifiers of actions, i.e., services associated with a context, applicable to that context is outputted in the information panel 43.

When the selected type is "favorites", a personalized subset of frequently used functions and resources within the selected context is outputted in the information panel 43.

When the selected type is "related", information related to the specific business context is outputted in the information panel 43.

When the selected type is "assistance", meta information like help, e-classes, and online communities that can be used in a business situation modeled by the context is outputted in the information panel 43.

When a parameter select control 431 with identifier "New Pos" is selected, the business application outputs data of parameters in the selected context that represent new purchase orders in a context parameter data field 436 in the information panel 43. In this example, the data outputted in the context parameter data field 436 is provided with controls in which a user can select additional information to be outputted in detail field 437.

Figure 4:
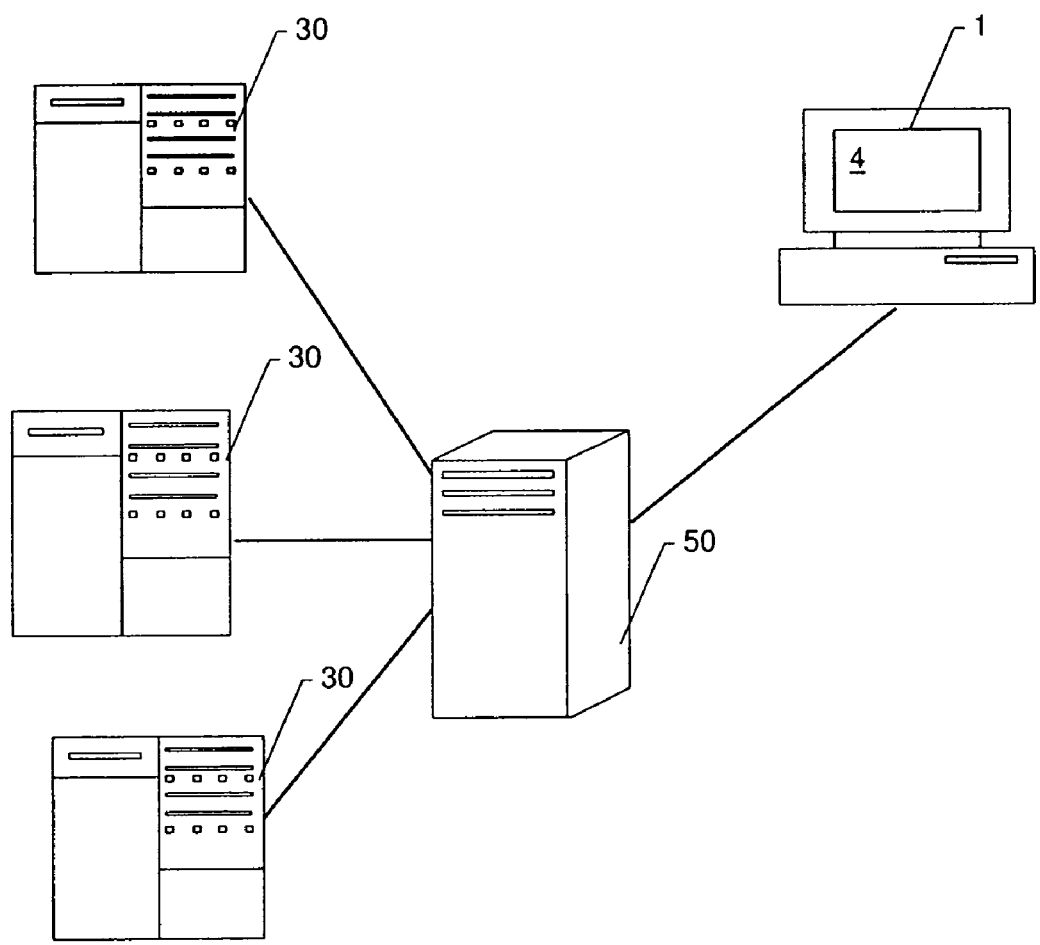
FIG. 4 is a block diagram of an exemplary computer network.

In FIG. 4, the user-interface 40 is shown in a different state. In this different state, a context representing a duplicate invoice situation is selected using an open control 44, a service associated with the selected context is invoked. In this example, the invoked service activates a separate window 45 in which a user can compare different invoices with each other, and determine whether or not an invoice is sent twice and how to solve the problem.

The control panel 41, also referred to as the "Control Center", provides a user with a business view across all applications and roles within a business situation represented by a certain context. In the information panel 43, which may also be referred to as the "Work Center", an overview is provided about the status and resources of one particular activity (workset). As those views reflect generic aspects of a business context, the Control Center and Work Center could also be seen as filters into a personal business context.

In this model, the Control Centre is the sum across all business contexts. In order to aggregate work contexts, one needs a standard way of defining business context, whether associated with a Work Center (e.g., WC1-3) or an Ad-Hoc Activity (e.g., AC 1-3), or with an instance of a business object or business process.

Once a standard context has been defined, a corresponding UI pattern or applications like a Universal Worklist, status dashboards, monitoring cockpits, people list, resource collection, service directory, and so forth, can be build to render various facets of context in a generic way If the UI is fully separated from the context definition, different UIs can be generated. Workcenter, Activity Center and Event Resolution Dashboard are just different interaction designs generated from the same underlying data model.

FIG. 4 illustrates an example of a computer network. The computer network includes at least one computer system 1, which may be implemented as shown in FIG. 1 or any other suitable manner. The computer network further includes a server system 50 in which, for example the contexts are stored and the business application may be running. The server system 50 is linked to the computer system 1. The server system 50 is connected to server systems 30 on which services are running. The business application on the server 50 can exchange data from a parameter of the context and a service associated with the context.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

The invention claimed is:

1. A computer program product residing on a machine readable storage device having a plurality of instructions stored thereon, which, when executed by a processor cause the processor to perform operations comprising:

rendering an activity browser configured to permit a user to browse a plurality of activities associated with a business from one singular control center;
displaying at least one context having a structure defined by a context template and representing a business situation at said activity browser, the context template including meta-data describing the context and representing a meta-model of the business situation, the context representing an activity-centric model in a first view, a collaborative activities model in a second view, and an object-centric model in a third view, each of the views displayed in an information panel accessible via the control center;
defining at least two interfaces between services and the context, each of the interfaces arranged for exchanging data from a parameter of the context and the service associated with the context;
outputting data representing information about the context;
displaying at least one parameter selection control configured to permit a user to select a plurality of parameter types, said plurality of parameter types including purchase orders, worklist information, pending actions representing information about pending workflow processes, task calendar including a plan and a schedule of work, trigger information that initiated a certain activity, and status information corresponding to the business situation; and
providing at least one identifier corresponding to a duplicate invoice situation, the at least one identifier, when actuated, configured to allow a display of one or more invoices for comparison.

2. The computer program product of claim 1 wherein the instructions further include instructions for selecting from the context data depending on a selection criterion and outputting the selected data.

3. The computer program product of claim 2 wherein the instructions further include instructions for selecting at least one selected context depending on a selection criterion, and outputting data from the at least one selected context.

4. The computer program product of claim 2 wherein the instructions further include instructions for selecting at least one of the context data and the context depending on a user.

5. The computer program product of claim 4 wherein the instructions further include instructions for selecting at least one of the context data and the context depending on a role of the user within an enterprise.

6. The computer program product of claim 5 further including instructions for allowing the user to select a context, and outputting data from the user selected context.

7. The computer program product of claim 1 wherein the output data comprises information about activities to be performed in the business situation represented by the context.

8. The computer program product of claim 1 wherein the output data comprises status information about a state of an aspect of the business situation represented by the context.

9. The computer program product of claim 1 further including instructions for providing at least one control to modify a parameter of the selected context.

10. The computer program product of claim 1 further including instructions for invoking at least one of the services associated with the selected context.

11. A computer-implemented method for running a business application comprising:
rendering an activity browser configured to permit a user to browse a plurality of activities associated with a business from one singular control center;
providing a memory in which at least one context having a structure defined by a context template is stored, the context template including meta-data describing the context and representing a meta-model of a business situation including one or more of: an activity-centric model, a collaborative activities model, and an object-centric model;
displaying the at least one context at said activity browser in one or more of an activity-centric model in a first view, a collaborative activities model in a second view, and an object-centric model in a third view, each of the views displayed in an information panel accessible via the control center;
enabling an interface between the context and a service associated with the context, the interface providing exchange of data between a parameter of the context and a service associated with the context;
outputting data from the context at a user interface;
displaying at least one parameter selection control configured to permit a user to select a plurality of parameter types, said plurality of parameter types including purchase orders, worklist information, pending actions representing information about pending workflow processes, task calendar including a plan and a schedule of work, trigger information that initiated a certain activity, and status information corresponding to the business situation; and
providing at least one identifier corresponding to a duplicate invoice situation, the at least one identifier, when actuated, configured to allow a display of one or more invoices for comparison.

12. The computer-implemented method of claim 11 further comprising: selecting from the context data depending on a selection criterion and outputting the selected data.

13. The computer-implemented method of claim 12 further comprising:
selecting at least one selected context depending on a selection criterion; and
outputting data from the at least one selected context.

14. The computer-implemented method of claim 13 further comprising: selecting at least one of the context data and the context depending on a user.

15. The computer-implemented method of claim 14 further comprising: selecting at least one of the context data and the context depending on a role of the user within an enterprise.

16. The computer-implemented method of claim 15 further comprising:
allowing the user to select a context; and
outputting data from the user selected context.

17. The computer-implemented method of claim 16 wherein the output data comprises information about activities to be performed in the business situation represented by the context.

18. The computer-implemented method of claim 17 wherein the output data comprises status information about a state of an aspect of the business situation represented by the context.

19. The computer-implemented method of claim 18 further comprising: providing at least one control to modify a parameter of the selected context.

20. The computer-implemented method of claim 19 further comprising: invoking at least one of the services associated with the selected context.

* * * * *